United States Patent
Brunet et al.

[11] Patent Number: 6,147,022
[45] Date of Patent: Nov. 14, 2000

[54] PROCESS FOR DEGRADED-MODE REGENERATION OF A CATALYST

[75] Inventors: Francois-Xavier Brunet, Vernaison; Olivier Clause, Chatou; Frédéric Hoffman; Jérémie Esquier, both of Paris, all of France

[73] Assignee: Institut Francais du Petrole, Rueil Malmaison Cedex, France

[21] Appl. No.: 09/296,533

[22] Filed: Apr. 22, 1999

[30] Foreign Application Priority Data

Apr. 22, 1998 [FR] France .................................. 98 05139

[51] Int. Cl.$^7$ .................................................. B01J 20/34
[52] U.S. Cl. .......................... 502/45; 502/35; 502/38; 502/50
[58] Field of Search ................... 502/35, 38, 45, 502/50

[56] References Cited

U.S. PATENT DOCUMENTS

| | | | |
|---|---|---|---|
| 4,056,490 | 11/1977 | Manning | 252/468 |
| 4,313,848 | 2/1982 | Scott | 252/418 |
| 4,444,896 | 4/1984 | Fung et al. | 502/37 |
| 4,666,586 | 5/1987 | Farnsworth | 208/161 |
| 4,769,128 | 9/1988 | Boyle | 208/140 |
| 4,786,400 | 11/1988 | Farnsworth | 208/80 |
| 4,872,970 | 10/1989 | Boyle | 208/140 |
| 4,980,325 | 12/1990 | Sechrist | 502/37 |
| 5,053,371 | 10/1991 | Williamson | 502/37 |
| 5,183,558 | 2/1993 | Owen et al. | 208/113 |
| 5,338,439 | 8/1994 | Owen et al. | 208/153 |
| 5,536,695 | 7/1996 | Blejean et al. | 502/327 |

FOREIGN PATENT DOCUMENTS

| | | |
|---|---|---|
| 0 258 137 | 3/1988 | European Pat. Off. |
| 0 378 482 | 7/1990 | European Pat. Off. |
| 2 642 330 | 8/1990 | France . |
| 2 761 909 | 10/1998 | France . |

Primary Examiner—Steven P. Griffin
Assistant Examiner—Cynthia M Donley
Attorney, Agent, or Firm—Millen, White, Zelano & Branigan, P.C.

[57] ABSTRACT

Process for regeneration of a catalytic moving bed in which the catalyst successively passes through at least one combustion zone A, at least one halogenation zone B, and at least one calcination zone C, whereby this process operates in a partial-regeneration-mode, the partially coked catalyst that is obtained from the last combustion zone passes into the halogenation zone in which the amount of halogen and the amount of oxygen are essentially zero—the valves of tubes (19) and (20) are then virtually closed—and the catalyst then passes through the calcination zone in which the amount of oxygen is essentially zero—the valve of tube (11) is then virtually closed.

22 Claims, 2 Drawing Sheets

PROCESS FOR DEGRADED-MODE REGENERATION OF A CATALYST

BACKGROUND OF THE INVENTION

1. Field of the Invention

The invention relates to a process for the regeneration of a catalyst, whereby said process operates in a degraded mode, (partial-regeneration) in the case where the combustion capacity of the regenerator is not sufficient to eliminate all of the coke that is deposited on the catalyst that is to be regenerated.

More particularly, this invention relates to the degraded-mode regeneration, or the partial-regeneration mode, of a catalyst that is used in moving-bed processes for the production of aromatic hydrocarbons, in particular the reforming or the dehydrogenation of paraffins. The catalyst that is used for the production of aromatic hydrocarbons, and in particular reforming, generally comprises a substrate (formed by, for example, at least one refractory oxide; the substrate can also include one or more zeolites), at least one noble metal of group VIII of the periodic table (Handbook of Chemistry and Physics, 76th Edition, 1995–1996), whereby this noble metal is preferably platinum and preferably at least a promoter metal (for example tin or rhenium), at least one halogen and optionally one or more additional elements (such as alkalines, alkaline earths, lanthanides, silicon, elements of group IV B of the periodic table, non-noble metals, elements of group III A, etc.). The catalysts of this type contain, for example, platinum and at least one other metal which are deposited on an alumina substrate; this alumina also undergoes chlorination before, after, or during the deposition of different elements. In general, these catalysts are used for the conversion of naphthenic or paraffinic hydrocarbons that are able to be transformed by dehydrocyclization and/or dehydrogenation, in reforming, or for the production of aromatic hydrocarbons (for example, production of benzene, toluene, ortho-, meta- or paraxylenes). These hydrocarbons come from fractionation of crude oils by distillation or other transformation processes. These catalysts are extensively described in the literature.

The catalysts that are used for the dehydrogenation of paraffins generally comprise a substrate that contains, for example, at least one refractory oxide such as alumina and at least one noble metal of group VIII of the periodic table; this metal is preferably platinum or at least an oxide of at least one element that is selected from the group that is formed by groups V and VI of the periodic table; these oxides are preferably chromium oxide, molybdenum oxide, or vanadium oxide. These catalysts also often contain one or more additional metals, such as potassium and/or lithium.

One of the ways of increasing the yields of these processes for reforming or aromatic compound production or else dehydrogenation of paraffins is to reduce the operating pressures at which the different advantageous reactions are carried out. For example, 30 years ago reforming reactions were carried out at 40 bar; 20 years ago it was 15 bar. Today, it is common to see reforming reactors that operate at internal pressures of 10 bar, in particular between 3 and 8 bar.

The enhancement of beneficial reactions caused by pressure reduction is accompanied by faster deactivation of the catalyst by coking. Coke, which is a compound of a high molecular weight that consists essentially of carbon and hydrogen, is deposited on the active sites of the catalyst. The H/C molar ratio of the coke that is formed varies from about 0.3 to 1.0. The carbon and hydrogen atoms form condensed polyaromatic structures whose percentage of crystalline organization varies depending on the nature of the catalyst and operating conditions of the reactors. Although the selectivity of the transformation of the hydrocarbons into coke is very low, the coke contents that accumulate on the catalyst can be significant. Typically, for fixed-bed units, these contents are often between 2.0 and 20.0 to 25.5% by weight. For circulating-bed units, these contents are generally less than 10.0% by weight.

The deposition of coke, which is faster at low pressure, requires a regeneration of the catalyst that is also faster. The current regeneration cycles can drop to 2–3 days.

2. Description of the Prior Art

The regeneration of these catalysts has already been described in the prior art; generally these regenerations are carried out according to three essential stages that are implemented in three corresponding zones. A combustion stage is thus carried out during which the coke is eliminated by burning with an oxygen-containing gas, a halogenation stage in which the catalyst is flushed with a halogen gas that contains water and that makes it possible to reintroduce halogen into the catalyst and to redisperse the metal phase, and a drying zone or calcination zone in which the water that is produced by the combustion of the coke as well as the water that is provided by the halogenation gas is eliminated. This 3-stage scheme is very often followed by a reduction stage during which the catalyst is reactivated. By regeneration, the user seeks to obtain a catalyst whose properties come as close as possible to those of the new catalyst; it is decoked, and the metal phase is redispersed. In prior art, the catalyst from combustion contains generally less than 0.1% coke.

Such processes are extensively described in the literature and, for example, in Patents U.S. Pat. No. 4,980,325, U.S. Pat. No. 5,053,371, EP-A-378482, and Patent Application FR 97/04660 from the applicant.

U.S. Pat. No. 4,980,325 describes a process for continuous or semi-continuous regeneration of a deactivated reforming catalyst. The process is carried out according to the three standard stages that are described above with a catalyst that comprises a metal of group VIII of the periodic table and a halogen that is deposited on a substrate with an alumina base. The combustion stage is carried out in the presence of a recycling gas whose molar oxygen concentration is about 0.5 to 1.5%, and the vent gas from this stage is partly evacuated and partly recycled to this combustion zone after being enriched with a so-called "oxygenpoor" gas.

This so-called "oxygen-poor" gas comes from a stream of air that has been divided into, on the one hand, an oxygen-poor flow—i.e., its oxygen concentration is less than 12% by volume—and, on the other hand, an oxygen-rich flow—i.e., its oxygen concentration is greater than that of air.

After the combustion stage, the catalyst undergoes a halogenation stage and then a calcination stage, in which said catalyst is brought into contact with a mixture that consists of a portion of the oxygen-rich flow, combined with air.

U.S. Pat. No. 5,053,371 describes a process for continuous regeneration of a reforming catalyst that is carried out according to the three standard stages that are described above. This process comprises a combustion stage in which the catalyst is brought into contact with an oxygen-containing recycling gas. This recycling gas is evacuated from the combustion zone, a fraction of this gas is evacuated from the device, and the other fraction is sent into a combustion recycling loop there is added. In the recycling loop, a mass of oxygen-containing gas that is equal to the mass of the fraction of this gas that is evacuated from the device.

The catalyst then undergoes a halogenation stage and then a calcination stage with an oxygen-containing gas. In the halogenation stage, a portion of the halogenation gas is recycled, and a halogen is added to this halogenation loop to maintain the halogen concentration in the halogenation zone. The various gases that circulate in the zones of the regeneration device can circulate in part and move from the calcination zone to the halogenation zone and then from the halogenation zone to the combustion zone. An enhancement of this invention consists in measuring the concentration in the recycling gas to determine the amount of oxygen-containing gas that is required for regeneration, and then in adding the required amount of oxygen-containing gas to the halogenation loop.

Patent EP-A-378,482 from the applicant discloses a process for continuous regeneration of a reforming catalyst or a catalyst for aromatic compound production that makes it possible to overcome the drawbacks that are inherent in increasingly short regeneration cycles. One of the stages of regeneration is the oxychlorination of the catalyst. According to Patent EP-A-378,482, the used catalyst gradually advances from top to bottom in a regeneration chamber where it successively encounters a first zone with a radial moving and combustion bed, a second zone with a radial moving and combustion bed, a zone with an axial oxychlorination moving bed, and a zone with an axial calcination moving bed, wherein (a) in the first combustion zone, the catalyst is treated by a combustion gas with an inert gas base that circulates in co-current with the catalyst and that contains 0.01 to 1% by volume of oxygen, whereby this combustion gas is obtained from a zone for scrubbing the gases that are obtained from combustion, oxychlorination, and calcination.

(b) in the second combustion zone, the catalyst is treated in the presence of the gases that come from the first combustion zone and in the presence of an inert make-up gas to which is added up to 20% oxygen by volume so that the catalyst is in contact with a gas that contains 0.01 to 1% oxygen by volume;

(c) the waste gases are evacuated from the second combustion zone and are sent to a scrubbing loop after having been previously mixed with gases that are drawn off from the oxychlorination zone and the calcination zone.

Patent Application FR 97/04660 describes a process for the regeneration of a reforming catalytic moving bed or for aromatic hydrocarbon production, or else for dehydrogenation of paraffins that contain a substrate, at least one noble metal, and at least one halogen; this process comprises a combustion stage with treatment of the catalyst in a moving bed in at least two successive combustion zones, an oxychlorination stage and a calcination stage, in which each combustion zone is separated from the adjacent combustion zones in order to be able to allow the catalyst to pass and to prevent the passage of the gases, at least one oxygen-containing gas is introduced into each zone of the combustion stage, and the gases that are produced are extracted from each zone; the harshness of the operating conditions in each zone of the combustion stage increases with the direction of the flow of the catalyst.

SUMMARY OF THE INVENTION

In all of the processes discussed above, the oxygen content in the combustion stage is adjusted so that virtually all, and preferably all of the coke is burned before passing into the halogenation stage. The applicant has now found that it is possible to make the regeneration process operate in a degraded mode (whereby this mode is a batch or semi-batch mode, i.e., limited in time), a process in which it is possible to tolerate incomplete combustion of coke for a certain time.

This process applies in the case where the combustion capacity of the regenerator is not sufficient to eliminate all of the coke that is deposited on the catalyst. In the case where the amount of coke that is to be burned is too large for the capacity of the combustion zone The standard regeneration processes of the catalyst, such as those that are cited above, generally have a destructive effect or at least cause an alteration of the catalyst due to the strong exothermicity that is caused by the combustion of the coke outside of the combustion zone, for example in the halogenation zone.

Conventionally, this process is applied when it is desired subsequently to treat feedstocks whose components are approximately identical but in which the proportions of each of the components are different. Thus, when the feedstock that is treated is particularly coking, the amount of coke that is deposited can be such that, after regeneration according to a standard process, coke is still left on said catalyst. The actuation of the regeneration process in degraded mode makes it possible to accelerate the process of removing the coke that is deposited on the catalyst, and the operation of the regeneration process in degraded mode is continued until the amount of coke that is deposited is acceptable for normal operation. The limited amount of coke that is deposited on the catalyst is selected in advance based on feedstocks that are to be treated and the specifications that are selected for the finished product. It is thus possible to vary the harshness of the combustion conditions; it is also possible to extend for a more or less long time the degraded-mode operation of the regeneration process.

More specifically, this invention relates to a process for the regeneration of a catalytic moving bed in which said catalyst successively passes through at least one combustion zone—into which at least one oxygen-containing gas is introduced—at least one halogenation zone, and at least one calcination zone. This process operates in a semi-batch fashion in degraded mode, or partial-regeneration mode, and the partially coked catalyst that is obtained from the last combustion zone passes into the halogenation zone. In this halogenation zone, the amount of halogen is approximately zero, and the amount of oxygen is less than ten percent of the amount of oxygen of the most oxygen-rich combustion zone, and the amount of oxygen is preferably zero (i.e., the ratio of the amount of oxygen in the halogenation zone/amount of oxygen in the most oxygen-rich combustion zone is <1:10).

Said catalyst then passes through the calcination zone in which the amount of oxygen is less than ten percent of the amount of oxygen of the most oxygen-rich combustion zone, and the amount of oxygen is preferably zero (i.e., the ratio of the amount of oxygen in the calcination zone/amount of oxygen of the most oxygen-rich combustion zone is <1:10).

The ratios of the amounts of hydrogen in the halogenation and calcination combustion zones are calculated absolutely and are not a function of the dimensions of said halogenation and calcination combustion zones.

This invention relates particularly to a process for regeneration in degraded mode of a catalytic moving bed for aromatic hydrocarbon production, for reforming or for dehydrogenation of paraffins.

The process according to this invention therefore makes it possible to operate the unit temporarily with more coking feedstock than that for which the unit was designed. This operation is carried out without stopping the circulation of the catalyst. According to ones skilled in the art, stable circulation that allows elimination, even an incomplete elimination, of the coke is always preferable.

The process according to this invention applies to all of the standard processes that comprise at least one combustion zone, a halogenation zone, and a calcination zone in which the introduction of oxygen into the gas that circulates in the combustion zone is independent of the introduction of oxygen into the gas that circulates in the halogenation zone—or more generally of any other zone of the process—and in which the introduction of oxygen into the gas that circulates in the combustion zone took place after it has been drawn off from the portion of the gases that is recycled from combustion to halogenation. According to this process, the combustion stage is carried out under standard combustion conditions, i.e., with the introduction of oxygen such as, for example, those that are described in the patents that are cited above; the halogenation and calcination stages are carried out according to the invention by closing the inlets of the various gases: the feeds of oxygen, halogenating agent, and water of the gas to the halogenation zone and the feed of oxygen of the gas of the calcination zone are thus halted.

The process takes place in a moving bed or with intermittent flows of the catalyst; in this case, each stage takes place in at least one different zone, whereby the catalyst flows from one zone to the next.

According to the process of this invention, in the combustion stage, an amount of coke that is smaller than the amount that is deposited on the catalyst is burned, and said catalyst—again partially coked—is then dried in the halogenation and calcination zones (because of the existing temperatures). The partially coked catalyst is intended to contain more coke than the decoked catalysts of the prior art which generally contains less than 0.1% coke. Accordingly, the partially coked catalyst of this invention contain at least 0.1% coke, preferably at least about 0.2%, about 0.3%, about 0.4%, or about 0.5% coke.

Since the halogenation and calcination stages are not carried out normally, the metal phase is not redispersed and the catalyst is not re-enriched with halogen; the catalytic properties that are linked to the metal phase and to the halogenated phase therefore are not totally reestablished. The catalyst, which thus is only incompletely regenerated, can be reduced all the same.

In a special way, this degraded-mode process can be used in the devices that are described in the texts of U.S. Pat. No. 4,980,325, U.S. Pat. No. 5,053,371, EP 378482, and Patent Application FR 97/04660 from the applicant, after which, if necessary, necessary modifications are provided that make it possible to introduce oxygen into the gas that circulates in the combustion zone(s) independently of the introduction of oxygen into the gas that circulates in the halogenation zone.

BRIEF DESCRIPTION OF THE DRAWINGS

Without wishing to restrict the scope of the invention, the description of the degraded mode process or partial-regeneration mode process according to this invention is made on the basis of the process that is described in Patent Application FR 97/04660.

DETAILED DESCRIPTION

Figure 1:
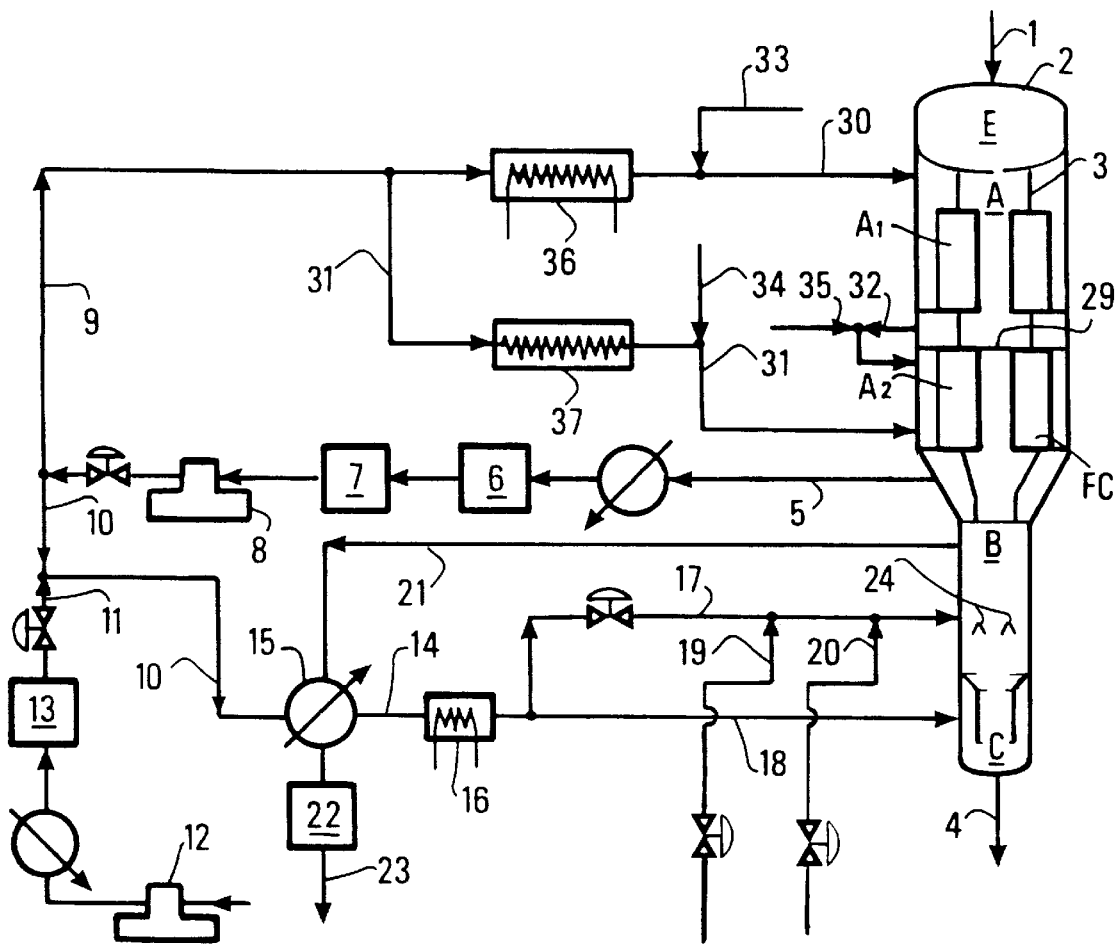
FIG. 1 shows a preferred embodiment of a process for partial regeneration of catalyst.

According to the process that is shown in FIG. 1, the combustion stage is carried out in at least two combustion zones, and generally the harshness of the operating conditions increases in the direction of flow of the catalyst. This invention can be applied regardless of the number of combustion zones and regardless of their arrangement (separate or not, radial, axial . . . ).

Advantageously, but without this being required for the embodiment of the invention, the combustion stage ends in a last so-called end of combustion control zone in which the oxygen consumption is less than 10% of the oxygen that enters into said zone. The temperature is preferably approximately constant. Preferably, the control zone is located in the lower portion of the last combustion zone, i.e., behind the end of the flame front. In addition, an oxygen-containing gas in an amount that is greater than that of the gases that enter at levels that are located upstream (in the direction of flow of the catalyst) is generally introduced into the control zone. It will be noted that in degraded mode, this zone, which is a normal-operation control zone, becomes a third combustion zone.

Multi-zone (or multi-stage) combustion is thus defined where each stage is characterized by a temperature that prevails in said stage, an initial temperature of the oxygen-containing gas, an oxygen content of the entering gas, a gas flow, and a length of time for which the coked catalyst is exposed to these conditions, in order to have a more effective combustion.

The catalyst that has undergone the combustion stage then passes into the halogenation zone in which the inlets of the gases that contain oxygen and at least one halogen are almost closed; preferably these inlets are closed. Furthermore, the conditions of temperature, pressure and circulation of the catalyst are those that are applied in the halogenation zone when the process operates in standard, i.e., non-degraded mode.

"Almost closed" in the meaning of this description refers to an amount of oxygen that is at least ten times larger in the combustion zones than in the halogenation and calcination zones.

In Patent Application FR 97/04660, the halogenation stage is more precisely an oxychlorination stage; in this description, the term "oxychlorination" has been retained.

The catalyst then passes into the calcination zone in which the inlets for oxygen-containing gas are almost closed, and these inlets are preferably closed. Furthermore, the conditions of temperature, pressure, and circulation of the catalyst are those that are applied in the calcination zone when the process operates in normal mode.

The installation of FIG. 1 for catalyst regeneration comprises at least one inlet tube (1) and one outlet tube (4) for the catalyst of the chamber. Said catalyst, in the form of a moving bed, successively passes through zones of combustion, oxychlorination, and calcination, whereby said chamber comprises:

at least two radial combustion zones (A1, A2) that are arranged in series, and between these combustion zones are arranged separation means that make it possible for the catalyst to pass between said zones into tubes— whereby these tubes are provided for this purpose but prevent gases from passing between said zones, advantageously an end of combustion control zone (FC) that is located in the inside portion of the last combustion zone, at least one tube (30) for introducing oxygen-containing gas into the first combustion zone, whereby the make-up oxygen is brought in via tube (33), at least one tube (32) for the evacuation of gases from one combustion zone and for their introduction into the following combustion zone after optional make-up of oxygen via tube (35), and at least one tube (31) for introducing oxygen-containing gas into the control zone, whereby the make-up oxygen is brought in via tube (34), at least one tube (5) for evacuating gases that are obtained from the combustion stage outside the chamber, whereby said tube is located before the oxychlorination zone and comprises at least one means for cooling said gases, at least one means (6) for treatment of said gases to eliminate impurities, at least one means (7) for drying gases, and at least one means (8) for their compression, at least one tube (9) for recycling a portion of the gases that are obtained from the combustion and then compressed, whereby this tube is connected to tubes (30) and (31), at least one tube (10) for evacuating the other portion of the gases that are obtained from combustion and then compressed, whereby this tube (10) is connected to a tube (14), and on tube (14) at least one gas heating means (16) is arranged, tube (14) is connected to at least one tube (17) which brings at least a portion of said gases into the oxychlorination zone, whereby tube (17) is connected to at least one tube (20) for introducing water and at least one tube (19) for introducing chlorinating agent, at least one tube (18) that is connected to tube (14) for introducing an oxygen-containing gas into the calcination zone, at least one tube (21) for evacuating the gases that are obtained from the oxychlorination zone that comprises at least one means (22) for treatment of said gases before they are evacuated outside the installation via tube (23).

Advantageously, tube (9) comprises at least one gas heating means that is brought into the control zone.

Advantageously, at least one gas heating means (36, 37) is arranged on each tube (30) and (31).

Advantageously, tube (5) comprises at least one cooling means, followed by at least one drier (7), and then at least one compression means (8). The gases that are obtained from the combustion stage are thus cooled, treated to eliminate impurities, and dried, and then, after oxygen make-up and optional reheating, at least a portion of these gases is sent into the first combustion zone.

Conventionally, the used catalyst that is to be regenerated enters into top (2) of regeneration chamber E via tube (1).

The catalyst is then introduced via tubes or legs (3) into a first combustion zone A1. In this zone, the catalyst undergoes a first burning or combustion with an oxygen-containing gas that is introduced via tube (30), whereby the make-up oxygen is brought in via tube (35).

In general, the combustion zones are of the radial, preferably annular, type, and the bed then flows into the annular space that is delimited by two coaxial cylindrical walls, whereby the gas enters via one wall and leaves via the other.

The gas, after passing into this first combustion zone, is extracted from said zone via tube (32), and at least part and preferably all of it is reintroduced into second combustion zone A2, in which the catalyst flows.

In general, the gas that is extracted from a combustion zone is reintroduced at least partly and preferably completely into the next combustion zone. Oxygen make-up is done, if necessary, via a tube (35). This arrangement makes it possible to make maximum use of the remaining oxygen and minimum use of oxygen make-up.

Combustion zones A1 and A2 are physically separated, so as to allow the catalyst to pass but prevent the passage of gases, for example, the direct passage of gases from A1 to A2.

One skilled in the art will choose the most suitable means for meeting this condition. In the FIG. 1 embodiment, a plate (29) is placed for this purpose between zones A1 and A2 in the entire section of regeneration chamber E, with the exception of sections that are reserved for the passage of the catalyst (legs or other tubes). To be sure, a little gas passes into zone A2 with the catalyst in legs (3), but this is only a small portion of the gas.

After passing into this second combustion zone, the gas is extracted from said zone via tube (5).

This separate management of the gases at each combustion zone makes it possible to know precisely at any given moment the temperatures of the gases that enter and exit and their amounts of oxygen. In addition to providing for maximum use of oxygen, this management makes it possible to control the combustion of the coke by controlling the operating conditions at each zone.

In a particularly advantageous way, an operation for controlling the end of combustion is carried out in a last zone of the combustion stage.

In the embodiment shown in FIG. 1, this operation is carried out in the lower part (in the direction of flow of the catalyst) of last combustion zone A2, and this lower part then constitutes a so-called control FC zone. In another embodiment, not shown, the control FC zone is a zone that is not included in last combustion zone A2.

Control zone FC is distinguished from a combustion zone in that the consumption of oxygen is approximately less than 10% of the entering oxygen in the FC zone. Advantageously, the prevailing temperature remains essentially constant (maximum variation of 3% and, better, maximum variation of 2%), measuring errors and heat losses excepted.

An oxygen-containing gas enters into this FC zone via tube (31), whereby said gas is extracted after it passes through the FC zone via tube (5) through which the evacuation of the gas that has passed through last combustion zone A2 is also done.

One skilled in the art will select suitable means for measuring oxygen consumption in the FC zone. For example, it is possible to measure the variation of the oxygen content between the inlet and the outlet of the FC zone from a variation of the content at the inlet (with the same total gas flow rate) and measurement of the variation of the content at the zone outlet. In general, if the operation of the preceding stages is correct, the oxygen consumption in the FC zone should be low (less than 23%).

Another method is to use means of measuring the temperature and/or the oxygen content either on the exiting gas (for example in the case where the gas leaves independently of the other gases that are obtained from combustion) or at the wall through which the gas leaves the FC zone.

It is also possible to adapt means for measuring the temperature of the catalytic bed or the catalyst that enters and leaves the control zone.

A simple means for controlling the proper operation of combustion stages is thus used, and the independent control of the gases of each stage makes it possible to quickly and easily eliminate combustion deficits by varying the temperature or the level of oxygen in one or more zones.

Actually, if the comparison of the oxygen contents or temperatures on gas and/or catalyst leads to variations in excess of the acceptable values for the process (less than 10% for oxygen and at most 3% for temperature), then at least one operating condition of at least one combustion zone is modified to correct the difference. This can be done by modifying the oxygen content and/or the temperature of the entering gas).

The user corrects, in general, the operating conditions to ensure complete combustion. In some cases, however, the user may not wish to do so, or else the feedstock becomes very coking and exceeds the adaptation capacities of the installation. Consequently, owing to the presence of the control zone, the user knows that the catalyst is also coked and that consequently he should operate the installation in degraded mode.

The operating conditions are selected for each combustion zone and are strictly controlled at each zone to reduce as much as possible the harmful effect of combustion on the catalyst.

Each combustion stage (zone) receives at least one oxygen-containing gas with
- a PPH (weight/catalyst weight/hour) that is between 1 and 50 $h^{-1}$ and preferably 10–40 $h^{-1}$ and even more preferably 15–35 $h^{-1}$,
- a temperature T that is between 350 and 600° C.,
- an $O_2$ oxygen content of at most 2% and preferably 0.01–2% and even more preferably 0.5–1.5%,
- each zone has a volume V that corresponds to a catalyst dwell time of 5 minutes to 3 hours.

For each zone, the initial temperature of the oxygen-containing gas and the oxygen content are such that:
- the maximum temperature at the bed outlet is less than a maximum permissible value, depending on the materials that are used (for example, 770° C. for a low-alloy steel),
- the maximum temperature rise between the inlet and outlet of the bed is less than 200° C. and preferably on the order of 100° C.,
- the temperature in the zone is at least 350° C. and less than 600° C., preferably less than 580° C. and, better, at most 550° C.,
- the temperature in the zone is greater than the temperature of the zone that immediately precedes it. Thus, in zone A2, temperature T2 is greater than T1 of zone A1.

These increasingly high temperatures result from the transfer of the hot catalyst from the preceding zone, the introduction of the hot oxygen-containing gas, the exothermal combustion reaction that develops, and the increasing harshness of the operating conditions.

Preferably, to guarantee proper operation of combustion, increasingly hot gases are introduced at zones that are encountered during the flow of the catalyst. Thus, temperature T2 of the gas that enters into the second zone will advantageously be greater than that T1 of the gas that enters into the first zone, and T3 will be greater than T2 (T3: temperature of the control zone).

More specifically, a gas that has a temperature that is at least approximately equal to the one that prevails at the end of combustion of the last combustion zone enters into the FC zone.

The oxygen content of the gas that is introduced is also increasingly large at the zones that are encountered by the catalyst, and the control zone corresponds to the highest oxygen content (an amount that is greater than that of the gases that enter at levels that are located upstream).

After undergoing combustion, the catalyst with a low content of carbon-containing material (in normal operation) arrives in oxychlorination zone (B) by moving into tubes or legs (3). Then, it flows toward calcination zone (C) and emerges from the chamber via tubes (4).

FIG. 1 shows an oxychlorination zone and a calcination zone; several are possible. These zones are very advantageously of the axial type. Between the combustion zones, on the one hand, and the oxychlorination zones, on the other, it is advantageously possible to use a plate or any other means for separating zones that make it possible to allow the catalyst to pass but not the gases.

The gases that are obtained from the combustion are evacuated via at least one tube (5), and the flow that is contained in tube (5) is then divided into two. The first flow is recycled via tube (9) into combustion zone (A) after oxygen make-up and optional reheating, while the other flow passes via tube (10).

A dry make-up oxygen (drier 13 preceded by a cooler) is added to the gas of tube (10) via a tube (11) which is connected to a compressor (12) that ensures an air flow, for example, a flow that is regulated by a valve depending on the required oxygen level in the gas.

According to the embodiment of FIG. 1, in the process according to Patent Application FR 97/04660, a portion of the gas of tube (14) directly feeds the oxychlorination zone via tube (17), while the other portion supplies the calcination zone via tube (18). The injection of the gas into the oxychlorination zone is done after a controlled amount of water vapor has been added via at least one tube (19) and a controlled amount of chlorinating agent has been added via at least one tube (20).

Preferably, tubes (17) and (18) come into the lower portion of each of the axial zones. At tube (17), at least one deflector (24) is advantageously arranged in the catalytic bed for a good distribution of gases. The gas is evacuated from the oxychlorination zone via tube (21) and advantageously passes into heat exchanger (15) before being directed into a scrubbing zone (22). The scrubbed gas can then be released into the atmosphere via tube (23) or more generally evacuated outside of the installation.

In a preferred way, a tube (18) that is connected to tube (14) is used to bring the oxygen-containing gas into the calcination zone, and tube (18) is preferably arranged behind furnace (16).

In the degraded-mode process, or the partial-regeneration-mode process, according to this invention, the valves that are arranged in tubes (19), (20) and (11) are closed. Only the gas that is obtained from the combustion circulates.

Figure 2:
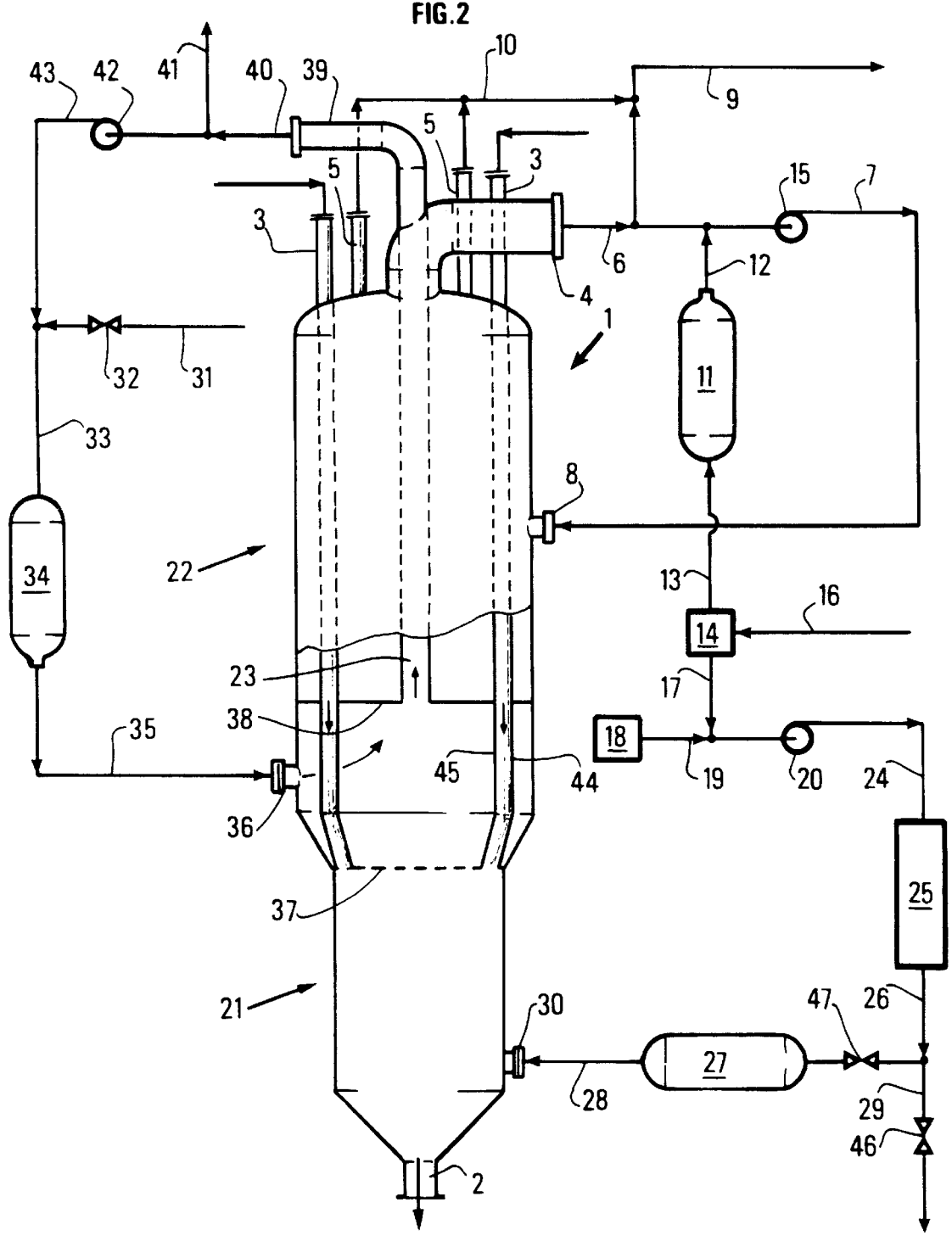
FIG. 2 shows an embodiment of the invention in another process.

Another embodiment is presented in FIG. 2. According to this embodiment, the catalyst that is to be regenerated is introduced into regenerator (1) via tubes (3). These tubes supply a catalytic bed that is formed by two concentric cylindrical walls, whereby the inner wall of this catalytic bed is shown by line (45) and the outer wall is shown by line (44). The catalyst is finally extracted from regenerator (1) via tube (2).

Said regenerator comprises an upper portion (22) and a lower portion (21). The gas of the upper portion is extracted from the regenerator via tubes (4) and (5), and the gas that circulates in tube (4) is sent via a tube (6) into a compressor (15). At the outlet of the compressor, the gas of tube (6) is sent via a tube (7) into the top portion of the regenerator, at the combustion zone of said regenerator. Admission into said regenerator is done via a tube (8). A portion of the gas that circulates in tube (6) is evacuated from the device via tube (9). The gas that is extracted from the regenerator via tube (5) is evacuated from the device via tube (9), and tube (10) connects tube (5) to tube (9). A make-up gas is heated by passing into furnace (11) and is added to the gas that circulates in tube (6) via tube (12).

The gas that circulates in tube (13) is obtained from a separation system (14). This separation system (14) makes it possible, from air that is admitted into tube (16), to obtain an oxygen-poor gas that is sent into tube (13) and an oxygen-rich gas that is sent into tube (17).

Air is also admitted into the device with a filter (18), and this filtered air is then sent into tube (19). The gas that circulates in tube (17) is also admitted into this tube (19). The gas that circulates in tube (19) is sent into a compressor (20), and the compressed gas is then sent into a tube 24 and then dried in a drier (25). At the outlet of the drier, the gas is sent into a tube (26) and then into a furnace (27). The gas that leaves furnace (27) is sent into a tube (28) via connection piece (30), and the gas of tube (28) is introduced into lower part (21) of regenerator (1) at the calcination zone of said regenerator. A valve (47) is arranged in tube (26); in contrast, upstream from this valve—relative to the circulation of the fluid—tube (26) is connected to a purging tube (29) on which a valve (46) is placed.

In this FIG. 2, a halogenation loop is also shown. A gas that contains at least one halogen is admitted into tube (31). This tube that is equipped with a valve (32) makes it possible to supply tube (33). The gas that circulates in tube (33) is heated in furnace (34) and then emerges in tube (35). The gas of tube (35) is then introduced via a connection piece (36) into regenerator (1) at the halogenation zone of said regenerator.

Since wall (37) is gas-permeable, the gas of the calcination zone that is introduced into regenerator (1) at its lower part (21) and the gas of the halogenation zone of said regenerator can be mixed. The mixture of the calcination and halogenation gases is then sent into tube (23), whereby wall (38) is gas-impermeable.

Tube (23) ends in a connection piece (39). The gas that leaves connection piece (39) is sent into a tube (40), a portion of this gas is evacuated from the device via tube (41), the other portion of this gas is sent into a compressor (42), and then the compressed gas is sent into a tube (43). Tube (43) feeds tube (33).

In the degraded-mode operation of the process according to this invention, valve (46) is open, and valves (32) and (47) are closed.

The entire disclosure of all applications, patents and publications, cited above, and of corresponding French application No. 98/05.139, filed Apr. 22, 1998 is hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for regenerating a moving bed of catalyst in which under normal operation said catalyst successively passes through at least one combustion zone into which is introduced at least one entering oxygen-containing gas, at least one halogenation zone comprising a halogen containing gas and at least one calcination zone comprising an oxygen-containing gas, said process comprising intermittently conducting said combustion partially to obtain a partially coked catalyst having at least 0.1% coke, and passing said partially coked catalyst into the halogenation zone, wherein the amount of halogen of the halogenation zone is essentially zero, and the amount of oxygen in the halogenation zone is less than ten percent of the amount of oxygen of the most oxygen-rich combustion zone, and passing said catalyst through the calcination zone in which the amount of oxygen is less than ten percent of the amount of oxygen that is contained in the gas of the most oxygen-rich combustion zone.

2. A process according to claim 1, wherein the amount of oxygen of the halogenation zone is substantially zero.

3. A process according to claim 1, wherein the amount of oxygen in the calcination zone is substantially zero.

4. A process according to claim 1, wherein said catalyst is from a process for the production of aromatic hydrocarbons or a reforming process.

5. A process according to claim 1, wherein the catalyst to be generated comprises a substrate, at least one noble metal of group VIII, and at least one halogen.

6. A process according to claim 1, wherein said catalyst is from a process for dehydrogenating paraffins.

7. A process according to claim 1, wherein the catalyst to be regenerated comprises a substrate, at least one noble metal of group VIII, or at least one oxide of an element from groups V or VI of the periodic table.

8. A process according to claim 7, wherein the catalyst to be generated comprises, in addition, at least potassium and lithium.

9. A process according to claim 1, wherein no halogen is passed into the halogenation zone wherein the amount of halogen is essentially zero.

10. A process according to claim 1, wherein said partially coked catalyst contains more than 0.2% coke.

11. A process according to claim 1, wherein said partially coked catalyst contains at least 0.3% coke.

12. A process according to claim 1, wherein said partially coked catalyst contains at least 0.4% coke.

13. A process according to claim 1, wherein said partially coked catalyst contains at least 0.5% coke.

14. A process for regenerating a moving bed of catalyst in which said catalyst successively passes through at least one combustion zone into which is introduced at least one entering oxygen-containing gas, at least one halogenation zone and at least one calcination zone comprising an oxygen-containing gas, said process comprising conducting said combustion partially to obtain a partially coked catalyst having at least 0.1% coke, said combustion being conducted in each combustion zone such that the oxygen content of the entering gas is between 0.01 and 2%, the temperature of the entering gas is between 350 and 600° C., and the dwell time of the catalyst in a zone is between 5 minutes and 3 hours, and passing said partially coked catalyst into the halogenation zone, wherein the amount of halogen of the halogenation zone is essentially zero, and the amount of oxygen in the halogenation zone is less than ten percent of the amount of oxygen of the most oxygen-rich combustion zone, and passing said catalyst through the calcination zone in which the amount of oxygen is less than ten percent of the amount of oxygen that is contained in the gas of the most oxygen-rich combustion zone.

15. A process according to claim 14, wherein the weight of oxygen-containing gas/weight of catalyst/hour (PPH) is between 1 and 50 $h^{-1}$.

16. A process for regenerating a moving bed of catalyst in which said catalyst successively passes through at least one combustion zone into which is introduced at least one entering oxygen-containing gas, at least one halogenation zone and at least one calcination zone, said process comprising intermittently conducting said combustion partially to obtain a partially coked catalyst having at least 0.1% coke, and passing said partially coked catalyst into the halogenation zone, wherein the amount of halogen of the halogenation zone is essentially zero, and the amount of oxygen in the halogenation zone is less than ten percent of the amount of oxygen of the most oxygen-rich combustion zone, and passing said catalyst through the calcination zone in which the amount of oxygen is less than ten percent of the amount of oxygen that is contained in the gas of the most oxygen-rich combustion zone, said process further comprising passing said partially coked catalyst through a combustion control zone after said combustion zone, wherein oxygen consumption in said combustion control zone is less than ten percent of the oxygen that enters said combustion control zone; and further comprising measuring temperature and oxygen content variation between an inlet and an outlet of said control zone so as to monitor the operation of said combustion zone, the variation for temperature is maximally 3% and the variation for oxygen is less than 10% within said combustion control zone.

17. A process according to claim 16, wherein said combustion control zone is located in an inside portion of a last combustion zone for controlling the end of combustion.

18. A process according to claim 16 further comprising measuring temperature variation between an inlet and an outlet of said control zone so as to monitor the operation of said combustion zone, the variation for temperature is maximally 3% within said combustion control zone.

19. A process according to claim 16 further comprising measuring oxygen content variation between an inlet and an outlet of said control zone so as to monitor the operation of said combustion zone, the variation for oxygen is less than 10% within said combustion control zone.

20. A process according to claim 16, further comprising adjusting the oxygen content and the temperature of the entering oxygen-containing gas of at least one combustion zone so as to obtain partial combustion of the catalyst.

21. A process according to claim 16, further comprising adjusting the oxygen content of the entering oxygen-containing gas of at least one combustion zone so as to obtain partial combustion of the catalyst.

22. A process according to claim 16, further comprising adjusting the temperature of the entering oxygen-containing gas of at least one combustion zone so as to obtain partial combustion of the catalyst.

* * * * *